Jan. 31, 1961 F. A. HOWARD 2,969,824
SAFETY PNEUMATIC TIRE
Filed May 16, 1956 3 Sheets-Sheet 1

INVENTOR.
FRANK A. HOWARD
BY
Kenyon & Kenyon
ATTORNEYS

Jan. 31, 1961 F. A. HOWARD 2,969,824
SAFETY PNEUMATIC TIRE
Filed May 16, 1956 3 Sheets-Sheet 2

INVENTOR.
FRANK A. HOWARD
BY
Kenyon & Kenyon
ATTORNEYS

Jan. 31, 1961 F. A. HOWARD 2,969,824
SAFETY PNEUMATIC TIRE
Filed May 16, 1956 3 Sheets-Sheet 3
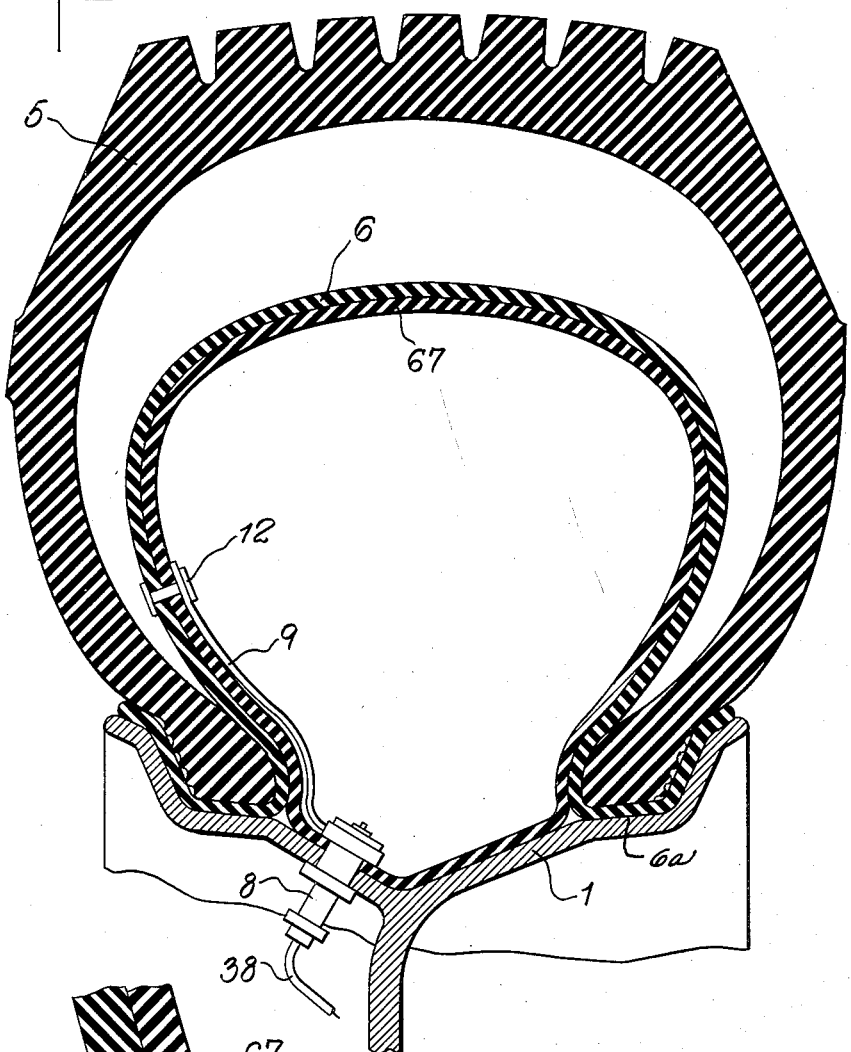
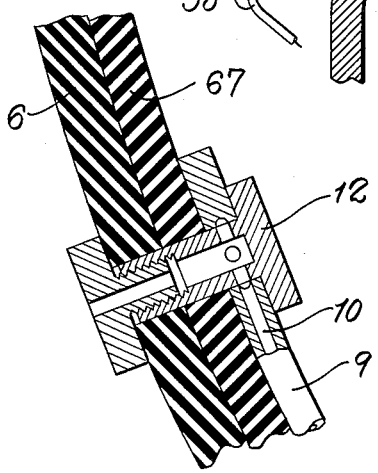
INVENTOR.
FRANK A. HOWARD
BY
Kenyon & Kenyon
ATTORNEYS United States Patent Office 2,969,824
Patented Jan. 31, 1961

2,969,824
SAFETY PNEUMATIC TIRE
Frank A. Howard, 30 Rockefeller Plaza, New York, N.Y.
Filed May 16, 1956, Ser. No. 585,223
2 Claims. (Cl. 152—340)

My invention relates to improvements in pneumatic tires. In my co-pending application Serial No. 134,957, now Patent No. 2,814,189, October 29, 1957, I have shown a strong and durable type of safety ring used in combination with a tubeless tire to carry the load for a short time in the event of sudden tire failure, as by blowout. In my co-pending application Serial No. 569,074, now Patent No. 2,934,127, April 26, 1960, I have shown a dual tire with a similar safety ring used as an inner tire which is cut off from the outer tire chamber by a dual inflation valve which prevents escape of air from the inner tire on deflation of the outer tire.

Figure 1:
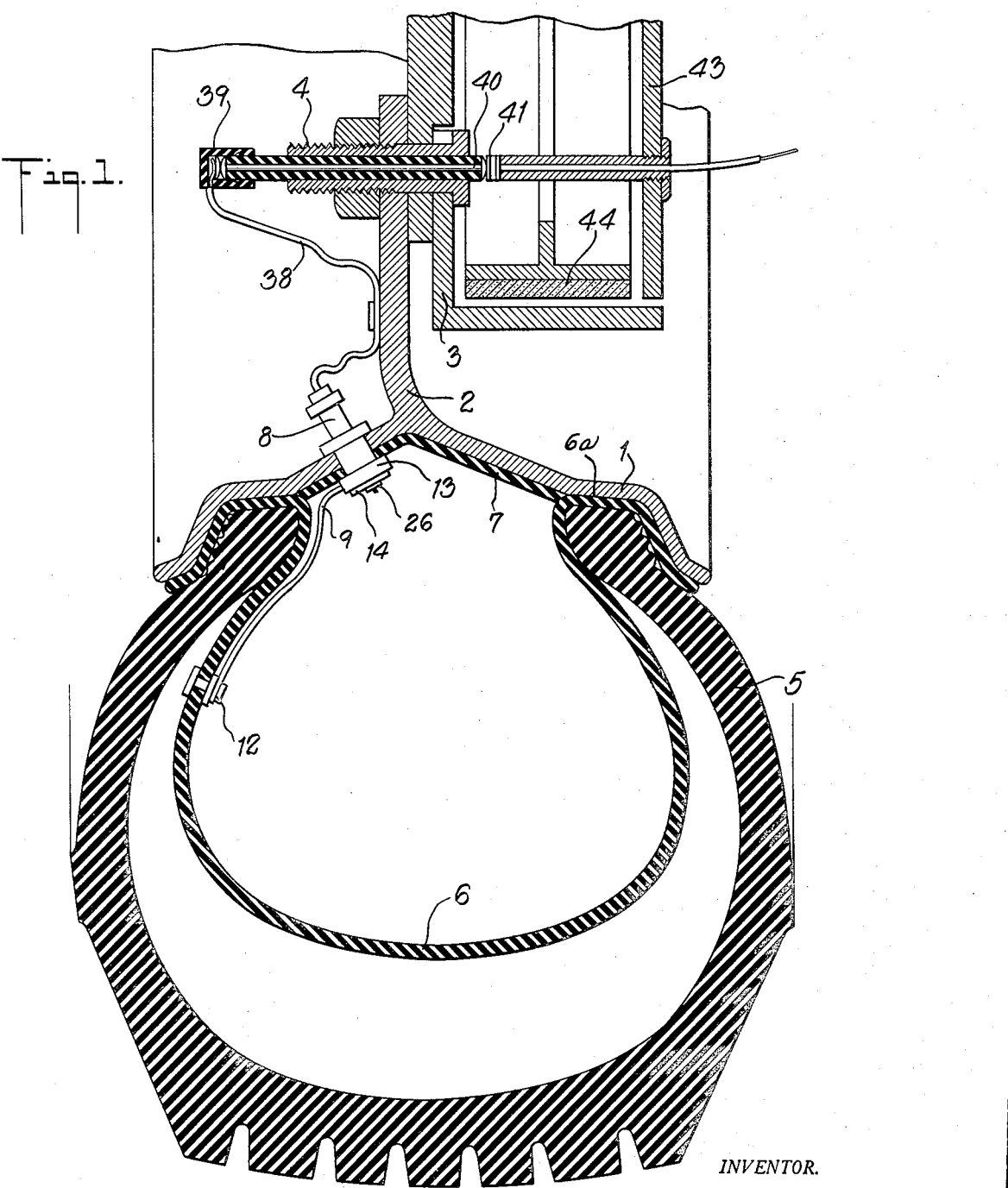
Figure 2:
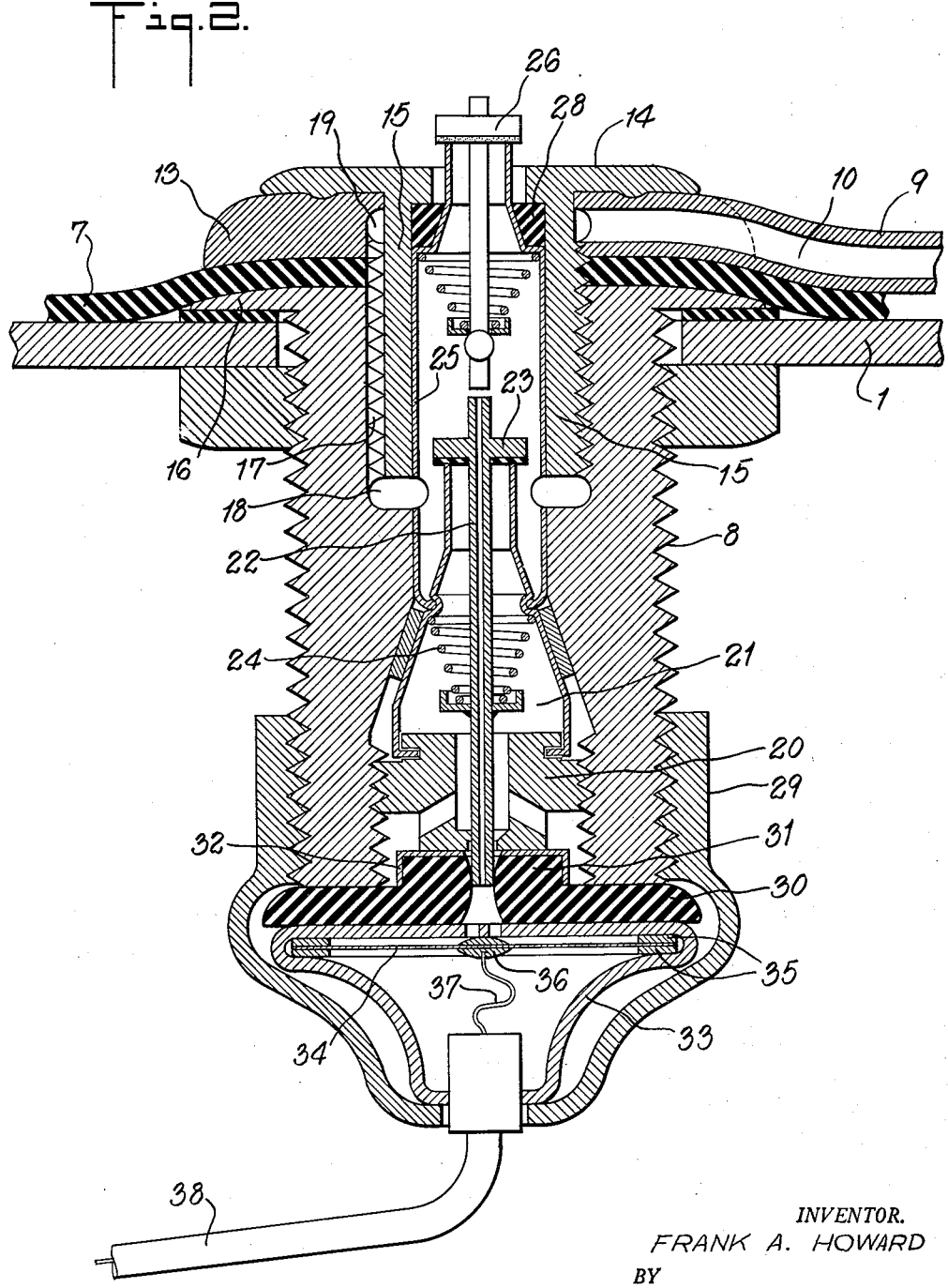

In my present application I have shown an improved dual-tire, dual-valve, construction embodying a deflation alarm which gives notice of loss of pressure in the outer tire. My present invention will be fully understood from the following specification, taken in connection with the annexed drawings in which:

Figure 1 is a fragmentary cross section through a rim, tire, disk wheel, and brake drum, Figure 2 is an enlarged cross section through a dual valve which may be mounted in the rim and may also be mounted in a complete inner tire, Figure 3 is a cross section of a modified tire construction using a complete inner tube inside the safety ring, and Figure 4 is an enlarged fragmentary section of the metal fitting which is used to deliver air to the outer tire chamber.

Referring to Figure 1, numeral 1 indicates a one-piece, drop-center metal rim carried by a demountable metal disk wheel 2 which is detachably secured to the wheel hub and to the brake drum 3 carried by the wheel hub. The mounting arrangements are commonly a plurality of wheel studs mounted in the hub or brake drum. For the purposes of my invention one such mounting stud, designated 4, is also used to carry the live wire of the deflation alarm circuit, as will later appear.

There is mounted on the rim 1 a straight-side tubeless tire 5 of ordinary construction and an inner tire comprising a torus 6 of the cross section of the Greek capital letter Omega, the marginal channels 6a of which embrace the beads of the tire 5, as shown and described in my earlier-filed applications referred to. The torus 6 is customarily made of two plies of rubber-coated cord fabric vulcanized together in a mold. In Figure 1 I have shown the open bottom or inner circumference of the fabric ring 6 closed by a strip 7 of rubber vulcanized or cemented at its margins to the inner marginal portions of the safety ring 6. The strip 7 thus converts the safety ring into a complete airtight torus, but it will be observed that the bottom strip 7 seats directly on the rim 1 save at its margins where it seats against and is bonded to the Omega ring 6. Although the strip 7 therefore prevents leakage of air under the tire beads from within the inner chamber formed by the safety ring 6, the ring itself still functions as before to carry the load in the event of failure or deflation of the tire 5, and utilizes the inextensible beads of the tire 5 as the anchorage which holds the safety ring firmly on the bead seats of the rim 1. Thus the bottom strip 7 may be regarded functionally and structurally as nothing more than an auxiliary seal to prevent air from leaking out under the channels of the ring. Accordingly, the bottom strip 7 may be of relatively thin sheet-rubber without reinforcement. In place of the rubber strip 7 I may use a separate complete inner tube of sheet-rubber, as shown at 67 in Figure 3. The safety ring 6, the tire beads, and the rim, carry all mechanical stresses, and the inner tube 67 has the sole function of forming a complete inner air barrier which unfailingly holds air in the inner tire chamber in the event of puncture or failure of the outer tire casing and also in the event of air leakage under the beads.

For use with the dual tire construction described, I employ a dual inflation valve designated 8, shown in detail in Figure 2. Where the strip 7 is used, as shown in Figure 1, this dual valve is secured first in that strip. A moulded rubber duct or conduit 9, sufficiently rigid to avoid collapsing the air channel 10 under external air pressure, connects the bore of a metal fitting 12 which passes through the safety ring 6 with a flat circular head 13 which forms the air connection to the dual valve. The rubber head 13 is gripped between the metal head 14 of the threaded nipple 15, and the metal head 16 of the valve body 8. Where the inner strip 7 or complete inner tube 67 is used, the rubber head 13 seats on the strip or tube and forms an airtight joint with it when the nipple and valve body are screwed together. The mating external threads of the nipple 15 and internal threads of the valve body 8 are interrupted (breechblock type) threads, having multiple interruptions wide enough angularly so that at any angular position there is an axial passage such as the passage 17 through the threads and connecting the groove 18 in the lower end of the threaded portion of the valve body with a moulded groove 19 in the flat head 13 which in turn connects with the air passage 10 to the metal fitting 12. The operating parts of the dual valve are assembled in a single removable valve core. This core has the usual core-nut 20 threaded into the open end of the valve body 8. The nut 20 carries a hollow sheet metal cone frustum 21 with the main valve seat at its open inner end. A central valve stem 22 carries a valve head 23 which closes this open end and is held against its seat by the valve spring 24. The valve core cone 21 also carries a cylindrical extension 25 which loosely fits the bore of the nipple 15. The extension 25 also ends in a cone frustum, the open outer end of which is closed by a spring-pressed valve 26. The inner end of the stem of the valve 26 clears the upper end of the stem 22 of the main valve 23, so that there may be slight opening of valve 23 before valve 26 is pushed open.

To seal the end of the cylindrcial valve core extension 25 in the open end of the nipple 15, a rubber ring gasket 28 of considerable depth may be confined between a shoulder on the end of the cylindrical valve core extension 25 and a flange in the open end of the nipple 15.

The cylindrical valve core extension 25 has perforations which register with the groove 18, so that the chamber within the valve core between the main valve 23 and the outer valve 26 communicates with the air passages 17, 19, 10 and thus with the outer tire chamber through the hole in the metal fitting 12 shown in Figure 6, The stem 22 of the main valve 23 may be made of hollow wire, so as to provide a minute capillary bore extending from one end to the other of the valve stem. It will be understood that while this method of by-passing the valve 23 through a very small passage has special advantages, as will later appear, the by-pass may be accomplished in other ways, as for example by a minute hole through the valve head.

In general, the purpose of the combination above described is to reduce the hazards involved in the use of pneumatic vehicle tires to such a point that enforced vehicle stops, to make on-the-spot tire repairs or changes, need no longer be contemplated. This avoids the need to carry in the vehicle at all times a spare wheel and tire, jack and accessory tools. To accomplish this result I have shown and described in the foregoing a combination including the following major elements.

First, a tubeless tire of conventional form.

Second, a strong and durable cord fabric safety ring within this tire, the ring being of the cross section of the Greek capital letter Omega. The channel-shaped margins of the ring embrace the beads of the tubeless tire so that these beads now have the function of anchoring and sealing the margins of the safety ring as well as anchoring and sealing the tire itself on the rim. To provide additional insurance against complete tire deflation through leakage of air under the tire beads or under the channel margins of the safety ring, I may also close the open bottom of the safety ring with a thin air-impermeable strip of sheet rubber in which the dual inflation valve is fastened, or I may use a complete inner tube of thin sheet rubber.

Third, to permit simultaneous inflation and deflation of both the outer and inner chambers of the tire equipped with the safety ring, I have shown a dual valve which holds air in the inner tire chamber if the outer chamber becomes deflated.

What I claim is:

1. In combination, a rim having side flanges, a C-shaped tire mounted on the rim and with inextensible beads seating thereon adjacent the side flanges, a strong flexible air-impervious safety ring having the cross section of the Greek capital letter Omega, smaller than the tire, and with its side channels embracing the tire beads to be sealed and mechanically anchored thereby on the rim when the tire is inflated, an air-impervious strip overlying the rim between the seated margins of the ring and bonded thereto in an airtight bond, to prevent leakage of air from within the safety ring under the marginal channels thereof, means to pass air into and out of the inner tire chamber formed by the ring and strip, and separate means to pass air into and out of the outer tire chamber.

2. In combination, an air-impervious vehicle rim having radial side flanges, an outer tire of C-shaped cross section having inextensible beads seating on the rim adjacent the side flanges, an inner tire made up of a ring of the cross section of the Greek capital letter Omega with its marginal channels embracing the tire beads so as to be sealed and mechanically anchored on the rim thereby, the body of said ring being sufficiently strong to carry the load imposed upon the wheel in the event of failure of the tire, a separate inner tube of thin sheet rubber enclosed by the ring and by the rim, a dual valve secured in the inner tube and passing through the rim, and a flexible air conduit joining the inner end of the dual valve with a reinforced air opening through the inner tube and the side wall of the ring to admit air through the dual valve to the outer chamber of the tire, the said dual valve including additional means to permit separate air flow into and out of the inner tire chamber.

References Cited in the file of this patent

UNITED STATES PATENTS

| | | |
|---|---|---|
| 1,556,542 | Phillips et al. | Oct. 6, 1925 |
| 1,653,054 | Mack | Dec. 20, 1927 |
| 1,703,734 | Henry | Feb. 26, 1929 |
| 1,804,209 | Cowperthwait | May 5, 1931 |
| 2,063,452 | McDonnell | Dec. 8, 1936 |
| 2,115,027 | Leonard | Apr. 26, 1938 |
| 2,150,648 | Eger | Mar. 14, 1939 |
| 2,167,398 | Tubbs | July 25, 1939 |
| 2,331,571 | Risser | Oct. 12, 1943 |
| 2,708,743 | Contri | May 17, 1955 |
| 2,714,636 | Trinca | Aug. 2, 1955 |
| 2,720,638 | Ritch | Oct. 11, 1955 |
| 2,756,800 | Riggs | July 31, 1956 |
| 2,811,189 | Howard | Oct. 29, 1957 |
| 2,822,015 | Petrasek | Feb. 4, 1958 |